United States Patent
Green et al.

(10) Patent No.: US 6,697,628 B1
(45) Date of Patent: Feb. 24, 2004

(54) APPARATUS, AND ASSOCIATED METHOD, FOR DETERMINING GEOGRAPHICAL POSITIONING OF A MOBILE STATION OPERABLE IN A RADIO COMMUNICATION SYSTEM

(75) Inventors: Marilynn P. Green, Pomona, NY (US); Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 24 days.

(21) Appl. No.: 10/087,531

(22) Filed: Mar. 1, 2002

(51) Int. Cl.[7] .................. H04B 15/00; H04B 17/00; H04B 71/85; H04L 27/06; H03D 1/00
(52) U.S. Cl. .................. 455/456; 375/341; 342/357.01
(58) Field of Search .............. 455/65, 456; 342/357.01, 342/361, 450; 375/285, 341

(56) References Cited

U.S. PATENT DOCUMENTS

| | | | |
|---|---|---|---|
| 5,701,328 A | | 12/1997 | Schuchman et al. |
| 5,933,462 A | * | 8/1999 | Veterbi et al. ............... 375/341 |
| 5,956,624 A | * | 9/1999 | Hunsinger et al. ........... 4555/65 |
| 6,111,538 A | * | 8/2000 | Schuchman et al. ......... 342/357 |
| 6,249,252 B1 | * | 6/2001 | Dupray ........................ 342/450 |
| 2001/0022558 A1 | * | 9/2001 | Karr, Jr. et al. .............. 342/450 |

* cited by examiner

*Primary Examiner*—William Cumming
(74) *Attorney, Agent, or Firm*—Federico Fraccaroli

(57) ABSTRACT

Apparatus, and an associated method, for determining the geographical positioning of a mobile station operable in a mobile radio communication system. Wideband signals are generated during pseudo-random time periods by a plurality of base transceiver stations. The ultra-wideband signals are of large bandwidths, e.g., 2 GHz, and of low signal energy levels. The mobile station detects the wideband signals sent thereto and, responsive thereto, determination of the geographical positioning of the mobile station is determined.

17 Claims, 3 Drawing Sheets

APPARATUS, AND ASSOCIATED METHOD, FOR DETERMINING GEOGRAPHICAL POSITIONING OF A MOBILE STATION OPERABLE IN A RADIO COMMUNICATION SYSTEM

The present invention relates generally to a manner by which to determine geographical positioning of a mobile station operable in a radio communication system, such as a cellular radio communication system. More particularly, the present invention relates to apparatus, and an associated method, that facilitates determination of the geographical positioning of the mobile station through the use of TOA (time-of-arrival) signaling. Large-bandwidth, low-energy signals are transmitted during pseudo-random time periods. Significantly-improved precision relative to conventional position-determination schemes is provided. The so-called 'hearability' problem associated with TOA-signaling schemes is reduced as the signals used by a mobile station in a position-determining procedure are more easily detected by the mobile station.

BACKGROUND OF THE INVENTION

A communication system provides for the communication of data between separate locations. At a minimum, a sending station is positioned at a first location, and a receiving station is positioned at a second location. The sending and receiving stations are interconnected by way of a communication channel. Data that is to be communicated by the sending station is communicated upon the communication channel to the receiving station.

A wide variety of different types of communication systems have been developed and are regularly utilized to effectuate communication of information between the sending and receiving stations. A radio communication system is exemplary of a type of communication system. And, a mobile communication system is a type of radio communication system that permits communications to be effectuated by way of mobile stations. Generally, a mobile station is carriable by a user and is used by the user to communicate telephonically therethrough.

A mobile station is generally constructed to appear to a user to be operable in manners generally analogous to operation of a conventional, wireline telephonic station. That is to say, telephonic calls can be originated by the user of the mobile station by entering dialing digits associated with a called party. And, a telephonic call can be terminated at the mobile station in manners generally analogous to the manner by which a telephonic call is terminated at a conventional, wireline telephonic station.

One significant difference, however, relates to the use of a radio link with a mobile station, rather than a conventional wireline connection with a wireline station.

When, for instance, a call is originated at a conventional wireline telephonic station, the geographical position from which the call is originated is easily determinable. A simple mapping of the telephonic identity of the originating station with the location at which the originating station is installed provides an immediate indication of the geographical positioning of the originating telephonic station. Even if the user of the telephonic station is unable to identify the location from which the call is originated or communicate such indication during telephonic communications, the location of the telephonic station is readily ascertained.

In contrast, because of the inherent mobility of the mobile station, a call can be originated by way of the mobile station from any of many different locations, typically, from any location within a geographical area encompassed by the cellular communication system. The geographical positioning of the mobile station is therefore not easily determinable.

Determination of the location at which the call is originated is vitally important, for instance, in a request for emergency assistance. If a request for emergency assistance is made by way of a mobile station and the user of the mobile station is unable to indicate to emergency personnel the location from which the request for emergency assistance is made, timely delivery of emergency assistance might not be possible.

Several manners by which to determine the geographical positioning of a mobile station have been set forth. One manner is to make use of GPS (global positioning system) technologies. A GPS receiver is a global positioning system to detect TOA (time-of-arrival) signals generated by satellite-based transmitters. Signals transmitted by three separate satellites of the global positioning system are used by the GPS receiver to determine an accurate positioning of the GPS receiver. Incorporation of the circuitry of a GPS receiver into a mobile station permits the geographical positioning of the mobile station readily to be determined. One scheme, referred to as an A-GPS (Assisted-Global Positioning System) scheme utilizes GPS signals generated by the satellite-based transmitters, has been proposed for use in various terrestrial-cellular communication systems.

An analogous scheme determines the geographical positioning of the mobile station through the use of TOA signals generated by separate base stations of the network infrastructure of the cellular communication system. Through detection of the times of arrival of signals generated by separate ones of the base stations, positioned at known, fixed-site locations, the geographical positioning of the mobile station is analogously also determinable. One scheme, referred to as an E-OTD (Enhanced-Observed Time Difference) scheme, utilizes signals generated by three separate base transceiver stations to determine the geographical positioning of a mobile station.

Problems, however, are associated with existing A-GPS and E-EOTD schemes by which to determine the geographical positioning of a mobile station.

The precision of the position determination is lacking. That is to say, the geographical positioning cannot note the position of the mobile station with a required degree of precision to permit, for instance, emergency personnel properly to respond to a request.

And, such schemes suffer from a so-called 'hearability' problem.

Detection of different TOA signals to make determination of the geographical positioning of the mobile station is somewhat problematic. A signal generated by a serving base station, however, might well mask currently-generated, co-channel radio signals, including signals generated by other base stations. If signals generated by the other base stations cannot adequately be detected due to the characteristics of the signal generated by the serving base station, geographical positioning determination cannot accurately be made.

A manner is therefore needed by which better to provide for the determination of geographical positioning of a mobile station operable in a radio communication system.

It is in light of this background information related to the determination of geographical positioning of a mobile station that the significant improvements of the present invention have evolved.

SUMMARY OF THE INVENTION

The present invention, accordingly, advantageously provides apparatus, and an associated method, by which to determine the geographical positioning of a mobile station operable in a radio communication system, such as a cellular radio communication system.

Through operation of an embodiment of the present invention, geographical positioning determination of the geographical positioning of the mobile station utilizing TOA signaling is facilitated.

In one aspect of the present invention, large-bandwidth, low-energy signals are transmitted during pseudo-random time periods. The so-called 'hearability' problem conventionally associated with TOA-signaling schemes is reduced as the signals used by a mobile station in a geographical positioning procedure are more easily detected by the mobile station. And, the precision of the position determination is significantly improved. Position-determination precision can be on the order of centimeters instead of, e.g., only dozens of meters permitted utilizing conventional schemes.

In another aspect of the present invention, the large-bandwidth, low-energy signals are generated upon channels, such as pilot channels defined in a CDMA system, together with signals, such as pilot signals, that are continuously broadcast. The large-bandwidth signals generated at individual ones of the base stations are each broadcast during separate, pseudo-random time periods to reduce the possibility of overlap. That is to say, the large-bandwidth signals generated by different ones of the base stations of at least a set of the base stations are generated during non-overlapping time periods. The pseudo-random selection of the time periods during which the large-bandwidth signals are generated reduce the possibility of overlapping signal generation by separate ones of the base stations. The large-bandwidth signals are generated, for instance, upon a common pilot channel defined in a W-CDMA (wideband, code-division, multiple-access) network or upon a broadcast channel in a TDMA (time-division, multiple-access) network. By generating such large-bandwidth signals, such signals make co-channel interference on the pilot channel appear to be a narrow band interferer. Subsequent correlation operations performed at the mobile station, only the large-bandwidth signal contributes, in a significant manner, to resultant correlation results. Correlation calculations are performed and are used to determine the time-of-arrival of a signal at the mobile station. The time-of-arrival of the signal, in one implementation, is determined to be the time at which a peak value of correlation determined by the correlation calculation is made. Suppression of pilot channel signals and receiver noise through the correlation function assist in improvements in the quality of the time-of-arrival determinations.

In another aspect of the present invention, insertion of a large-bandwidth, e.g., 2 GHz, signal is intermittently injected into the channel. Detection of the signal, and subsequent operations performed thereon, permit the accuracy of geographical positioning determinations to be increased. Also, use of such large-bandwidth signals increases the possibility that a mobile station shall be able to detect the signals generated by enough base stations to permit the geographical positioning of the mobile station.

Implemented in an otherwise-existing CDMA or TDMA (or other) communication system, new apparatus is provided for the network part of the system. The new apparatus causes the generation of the large-bandwidth, low-energy signal for broadcast upon the a channel to which the mobile station tunes. Pseudo-random transmission time periods are determined to reduce the possibility of concurrent transmission of the large-bandwidth signals upon the pilot channel. And, because the signal energy level of the signals is of a low value, i.e., beneath the noise floor of the channel, the interference-causing characteristics of such signals are minimal.

Apparatus is also provided for the mobile station, or elsewhere, to determine the geographical positioning of the mobile station. Detection is made at the mobile station of the large-bandwidth signals. Correlation operations are performed upon the detected signal energy, and the times of arrival of the large-bandwidth signals. A position determination is made through solution of a set of non-linear equations that are functionally dependent upon measured time differences, together with known coordinates of the base stations from which the signals are broadcast, together with their times of transmission.

In these and other aspects, therefore, apparatus, and an associated method, is provided for a radio communication system operable to communicate communication signals upon a common bandwidth. The radio communication system has a network part installed to encompass a geographical area and a mobile station positionable therein. Determination of geographical positioning of the mobile station is facilitated. At least a first wideband signal generator generates at least a first wideband signal upon at least a first channel. The first channel is allocated to at least a first network station upon which to transmit a first signal. The first wideband signal is generated during first pseudo-random time periods, together with the first signal. The first wideband signal is of a bandwidth greater than a corresponding first-signal bandwidth of the first signal, and the first wideband signal is of a signal level less than a corresponding first-signal signal strength.

A more complete appreciation of the present invention and to the scope thereof can be obtained from the accompanying drawings that are briefly summarized below, the following detailed description of the presently preferred embodiments of the invention, and the appended claims.

DETAILED DESCRIPTION

Figure 1:
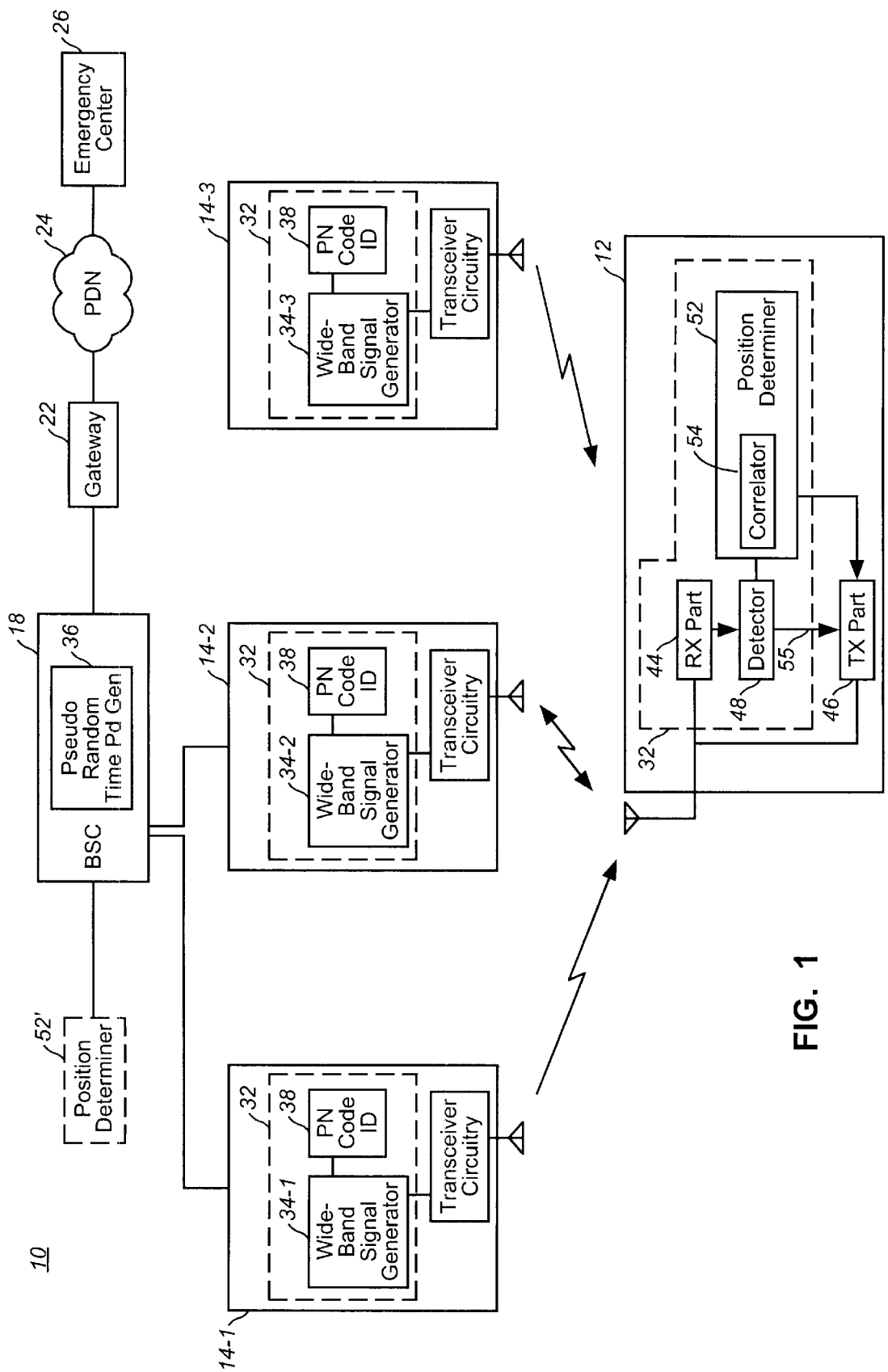
FIG. 1 illustrates a functional block diagram of a cellular communication system in which an embodiment of the present invention is operable by which at least to facilitate determination of the geographical positioning of a mobile station.

Referring first to Figure, a communication system, shown generally at 10, provides for radio communications with mobile stations, of which the mobile station 12 is exemplary. Communication of both voice and non-voice data can be communicated with the mobile station.

In the exemplary implementation shown in the figure, the communication system 10 forms a cellular communication system. The cellular communication system is exemplary of a system that utilizes a CDMA (code-division, multiple-access) communication technique, such as a communication system constructed generally pursuant to the IS-2000 (Interim Standard-2000) cellular communication standard. And the communication system is exemplary of a system that utilizes a TDMA (time-division, multiple-access) technique, such as a GSM (Global System for Mobile communications) system.

It should be understood at the outset, of course, that an embodiment of the present invention is similarly also implementable in other types of radio, and other, communication systems. Therefore, while the following description shall describe operation of an embodiment of the present invention with respect to an implementation in which the communication system 10 is constructed generally pursuant to a multiple-access, cell operation of an embodiment of the present invention can analogously also be described with respect to any of various other types of communication systems to effectuate power control therein.

During operation of the communication system, two-way communications are permitted between the mobile station 12 and a network part of the communication system. The network part of the communication system includes fixed-site, radio transceivers, referred to as base transceiver stations (BTSs) 14. Three base transceiver stations, base transceiver stations 14-1, 14-2, and 14-3, are shown in the figure. In an actual implementation, a communication system typically includes a large number of base transceiver stations. Signals generated by the base transceiver stations are referred to as "forward-link" signals and are communicated upon forward links defined of a portion of the radio link formed between the network part of the communication system and a mobile station. And, signals generated by the mobile station and communicated to the network part of the communication system are referred to as "reverse-link" signals, generated upon a reverse link formed of a portion of the radio link.

Both traffic channel signals and broadcast channel, or pilot channel, signals are communicated upon forward links formed with the mobile station. Traffic channel signals are communicated upon traffic channels. Pilot signals are defined in the aforementioned CDMA system and are communicated upon pilot channels. Broadcast message signals are defined in the aforementioned GSM system and are communicated upon broadcast channels. In a CDMA system, the traffic channel signals are power-controlled, while the pilot channel signals are non-power-controlled. The pilot channel signals generated upon the pilot channels by different ones of the base transceiver stations are continuously transmitted and are, in the absence of fading, of substantially constant characteristics.

The base transceiver stations, in turn, are coupled to a control device, here a base station controller (BSC) 18. The controller 18 operates, amongst other things, to control operations of the base transceiver stations. And, in turn, the controller is coupled to a gateway device 22 that forms a gateway to a communication network, here a packet data network, such as a voice over IP (voice over Internet Protocol) network 24.

An emergency dispatch center 26 is here shown to be coupled to the communication network 24. During operation of the communication system, a communication session is formable between the mobile station 12 and the emergency dispatch center 26. A user of the mobile station 12 might, for instance, initiate the communication session to report to the emergency dispatch center and emergency situation. Requirements have been set forth to provide in a cellular communication system the capability of automatically determining the positioning of the mobile station, at least to alert personnel of the emergency dispatch center of the location from which the communication session is initiated, i.e., the location at which the call is placed.

While manners have been set forth by which to determine the positioning of the mobile station utilizing, in essence, a triangulation technique using time-of-arrival signals generated by three base stations, problems are associated with existing techniques. Signals generated by base transceiver stations other than the serving base transceiver station are difficult to detect by the mobile station. And, the precision of the position determination is inadequate. Through operation of an embodiment of the present invention embodied in the communication system 10, the so-called hearability problem is overcome, thereby to improve the capability accurately to determine the positioning of the mobile station. And, the precision of the position determination is significantly improved.

The network part of the communication system includes apparatus, here represented at 32, of an embodiment of the present invention. The apparatus 32 is represented functionally in the figure and can be implemented in any desired manner. Here, the apparatus 32 is implemented at each base transceiver station, including the three base stations 14-1, 14-2, and 14-3, shown in the figure. The apparatus 32 is operable to introduce upon the broadcast, or pilot, channel associated with each of the base transceiver stations, an ultra-wideband, e.g., 2 GHz signal for transmission upon such broadcast, or pilot, channels to be detected by the mobile station. The ultra-wideband signal is generated by the base transceiver stations during pseudo-random time periods so as not to overlap with one another.

Accordingly, the apparatus 32 associated with each base transceiver station includes a wideband signal generator 34 for generating the ultra-wideband signal. The ultra-wideband signal generated by the respective ones of the generators 34, here generators 34-1, 34-2, and 34-3, are provided to the transmit parts of the transceiver circuitries 18 of the respective base transceiver stations. The pseudo-random time periods during which the signals are generated by the signal generators are selected, for instance, by a pseudo-random time period generator 36, here forming a part of the controller 18. The functionality of the pseudo-random time period generator 36 can also be located elsewhere, such as distributed amongst the base transceiver stations 14.

The wideband signal generator is coupled to a PN code identifier 38 that is associated with individual ones of the base transceiver stations. The signals generated by the signal generators 34 include values of the PN codes, thereby identifying the source from which the wideband signals broadcast by respective ones of the base transceiver stations. The signals generated by the generators 34 and broadcast during the pseudo-random time periods upon the broadcast or pilot channels associated with the respective ones of the base transceiver stations are broadcast together with the signals conventionally broadcast by the base transceiver stations on such channels.

The mobile station also includes transceiver circuitry capable of detecting forward-link signals transmitted thereto and for transmitting reverse-link signals generated thereat.

Here, the transceiver circuitry is shown to be formed of its component parts, a receive part 44, and a transmit part 46.

The mobile station here further includes apparatus, also designated at 32, of an embodiment of the present invention. Again, the apparatus 32 is formed of functional elements that can be implemented in any desired manner, such as by algorithms executable by processing circuitry. The apparatus 32 here includes a detector 48 as well as the receive part 44. The receive part 44 is at least selectably operable as a wideband receiver to receive the ultra-wideband signals generated by the network part. The detector operates to detect reception at the mobile station of signals transmitted thereto upon broadcast, or pilot, channels. Indications of detections made by the detector are here provided to a position determiner 52 that includes a correlator 54. The correlator operates to perform correlation operations upon the indicia provided thereto. And, responsive to such correlations, position determinations of the position at which the mobile station is located are made. Determined position indications are provided to the transmit part and returned by a reverse link to the network part of the communication system and, for instance, forwarded on to the emergency dispatch center.

In another implementation, detections made by the detector are provided directly, here indicated by the line 54, to the transmit part 46. In this alternate implementation, the position determiner is located at the network part of the communication system. Indications of detections made by the detector are communicated by way of the transmit part 46 back to the network part of the communication system. Here, in this alternate implementation, the position determiner, here indicated at 52', determines the position of the mobile station. Such information is forwarded on, for instance, to the emergency dispatch center. The position determiner comprises, for instance, a position determination entity defined in a CDMA system or a location controller defined in a GSM system.

Figure 2:
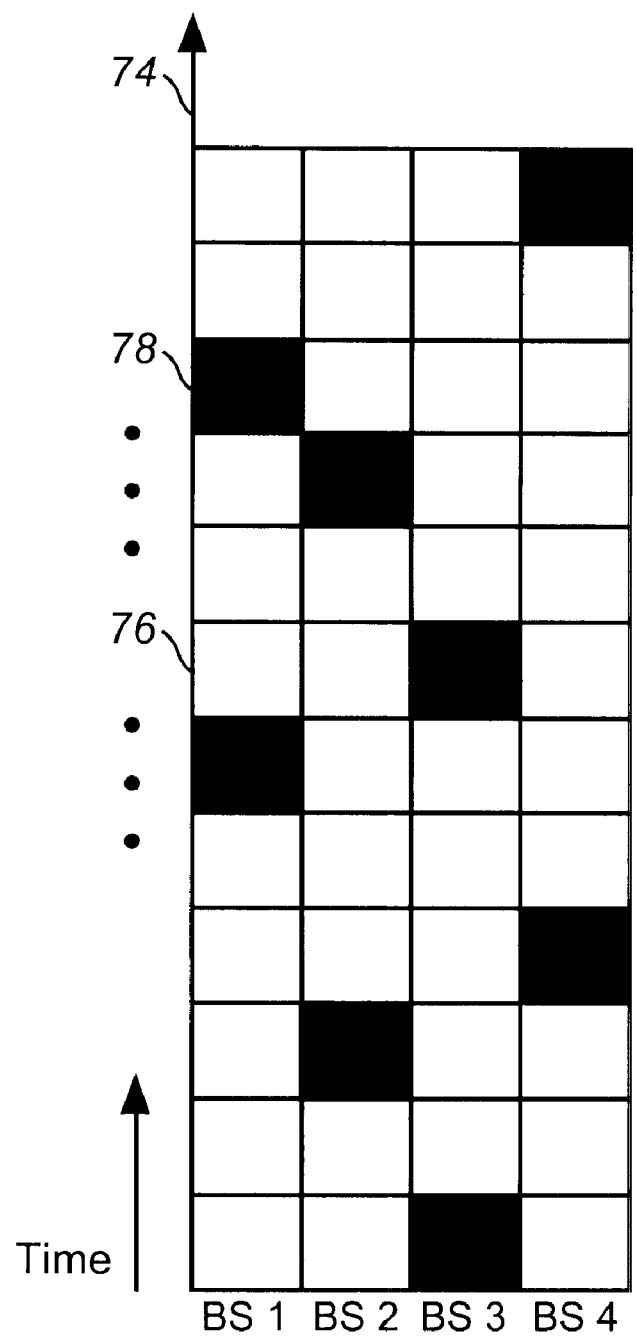
FIG. 2 illustrates a graphical representation showing the pseudo-random time periods during which the ultra-wideband signals are generated during exemplary operation of the communication system shown in FIG. 1

FIG. 2 illustrates a representation, shown generally at 72, of the non-overlapping nature of the pseudo-random signals generated by the signal generators 34 of various ones of the base transceiver stations 14 shown in FIG. 1. Time, plotted along the ordinate axis 74, is divided into substantially-equal time periods 76. The ultra-wideband signal generators located at separate ones of the base transceiver stations generate the ultra-wideband signals during time periods 78, shown in dash in the figure. The pseudo-random nature of the signal generation at each base transceiver station reduces the possibility of concurrent generation of the ultra-wideband signals. The time periods during which the ultra-wideband signals are generated are referred to as active period downlink (APDL) intervals. During the APDL, which as noted above, is activated at pseudo-randomly chosen times at each base transceiver station, is the period of time during which the base transceiver station injects an ultra-wideband signal into its normal pilot channel transmission. The ultra-wideband signal generated by each base transceiver station includes a PN code that, once received at the mobile station, is correlated by a correlator 54. Through the generation and transmission of the ultra-wideband signal, the amount of post-processing, co-channel interference measured at the mobile station is reduced as the desired, ultra-wideband signal is spread over a much wider bandwidth than pilot channel signals, conventionally generated and used for position determining operations.

During operation, the mobile station 12 monitors the broadcast or pilot channel of its serving cell to detect the broadcast message signal or the pilot signal generated by the serving base transceiver station, in order to learn of the schedule for APDL transmission at the serving cell as well as those of neighboring sites.

Transmissions of a particular base transceiver station are observed during the APDL of the base transceiver station. The receive part of the mobile station adjusts during the APDL to accommodate the wideband bandwidth of the APDL signal. And, the radio signal received during the APDL of a particular base transceiver station is, and can be expressed as, the sum of the ultra-wideband signals generated by the base transceiver station, the normal channel signal transmissions generated by all of the base transceiver stations, including the desired base transceiver station, and thermal noise of the mobile station.

Then, the mobile station correlates the APDL signal together with a known PN code used for ultra-wideband transmissions to obtain an estimate of the correlation function therebetween. The mobile station processes the correlation function estimate to obtain the time, or time difference, of arrival of the APDL signal. The operation of correlating the APDL signal together with the PN code of the ultra-wideband signal suppresses the pilot channel signals as well as the thermal noise of the mobile station as such signals are uncorrelated, while also enhancing the desired ultra-wideband signal.

Measurements are successively made of transmission by each base transceiver station whose signals are required in order to obtain an accurate position determination. Once the measurements are made of signals generated by each of the base transceiver stations, a position estimate is obtained.

In an implementation in which the position determining entity, i.e., the position determiner 52, is located at the network part of the communication system, indicated in the figure at 52', the indications of measurements made at the mobile station are returned by way of reverse links and routed to the position determiner for the position determination to be made thereat.

Through operation of the apparatus 32, accurate position determinations in a mobile radio communication system are made all without significantly interfering with conventional transmissions therein as the power levels of the ultra-wideband signals are selected to be beneath a noise floor defined in the system. Additionally, generation of the ultra-wideband signal does not result in addition of a significant amount of additional interference as the ultra-wideband signals are transmitted during random times and at energy levels that are beneath the system noise floor. Also, continuous on-air transmissions of signals on the pilot or broadcast channel are permitted. The base transceiver station need not power-down in order to transmit during the APDL. The ultra-wideband signal generated by the ultra-wideband signal generators 34 are simply transmitted in addition to the normal transmissions.

Use of the ultra-wideband signals reduces the effect of the hearability problem for mobile station positioning as the ultra-wideband signal is used to receive signals from distant base transceiver stations or from base transceiver stations that are nearby but are usually masked by a relatively stronger signal received by a serving base transceiver station. And precision of the position determinations can be on the order of centimeters, much better than the precision permitted of conventional techniques.

And, as the APDL signal utilizes a significantly wider bandwidth than normal transmissions, such signals shall have higher time-resolutions than signals received during normal pilot channel transmissions. Having a higher time-resolution directly corresponds to the production of a more-accurate time-of-arrival estimate and would be possible using only normal transmissions.

Figure 3:
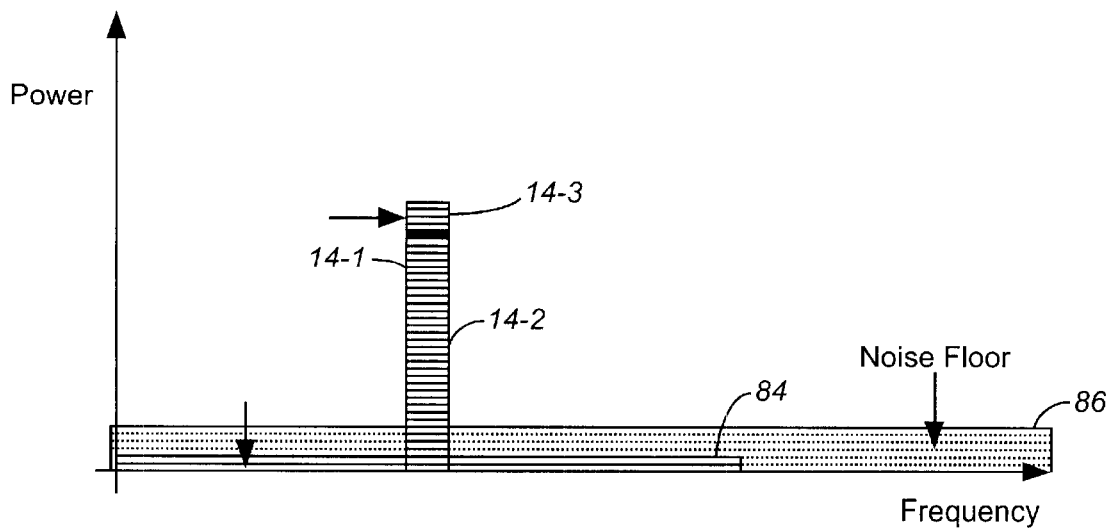
FIG. 3 illustrates a graphical representation of the signal energy detected by a mobile station, also during exemplary operation of the communication system shown in FIG. 1.

FIG. 3 illustrates graphically an exemplary signal generated during an APDL interval in a CDMA system in which the power level of the signal is plotted as a function of frequency. The receive signal, received at a mobile station, includes normal pilot channel signal transmissions generated by each of the base transceiver stations, here to neighbor-cell base transceiver station 14-1 and 14-3, as well as the serving base transceiver station 14-2. And, detection of the ultra-wideband signal 84 is also detected. The energy level of the ultra-wideband signal is beneath the noise floor 86 defined in the system.

Figure 4:
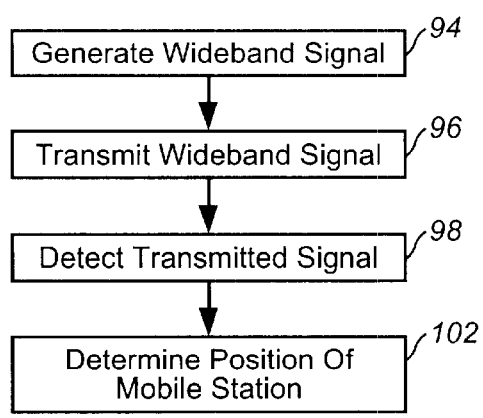
FIG. 4 illustrates a method flow diagram listing the method steps of the method of operation of an embodiment of the present invention.

FIG. 4 illustrates a method flow diagram, shown generally at 92, illustrating an embodiment of the present invention. The method facilitates determination of geographical positioning of a mobile station operable in a mobile radio communication system.

First, and as indicated by the block 94, at least a first wideband signal is generated upon at least a first channel allocated to at least a first network station. The wideband signal is of a bandwidth greater than a corresponding bandwidth of a first signal and of a signal level less than a corresponding signal, signal strength. Then, and as indicated by the block 96, the at least the first wideband signal is transmitted upon the at least the first channel.

The transmitted signal is thereafter, and as indicated by the block 98, detected at the mobile station. And, as indicated by the block 102, the geographical positioning of the mobile station is determined responsive to indications of the detections of the wideband signals delivered to the mobile station.

Thereby, through operation of an embodiment of the present invention, a manner is provided by which to facilitate the determination of the geographic positioning of a mobile station utilizing time-of-arrival signaling.

The previous descriptions are of preferred examples for implementing the invention, and the scope of the invention should not necessarily be limited by this description. The scope of the present invention is defined by the following claims:

What is claimed is:

1. In a radio communication system operable to communicate communication signals upon a common bandwidth, the radio communication system having a network part installed to encompass a geographical area and a mobile station positionable therein, the radio communication system defining a noise floor level upon the common bandwidth, an improvement of apparatus for facilitating determination of geographical positioning of the mobile station, said apparatus comprising:

at least a first wideband signal generator for generating at least a first wideband signal for communication upon at least a first channel allocated to at least a first network station upon which to transmit a first signal, the first wideband signal generated during first pseudorandom time periods, together with the first signal and the first wideband signal of a bandwidth greater than a corresponding first-signal bandwidth of the first signal and the first wideband signal of a signal level less than a corresponding first-signal signal strength, and the signal level of the first wideband signal less than the noise floor level;

a transmitter coupled to said first wideband signal generator, said transmitter for transmitting the first signal upon the first channel, the first signal used, subsequent to detection at the mobile station, to facilitate the determination of the geographic positioning of the mobile station.

2. The apparatus of claim 1 wherein said at least the first wideband signal generator further comprises a second wideband signal generator for generating a second wideband signal for communication upon a second channel allocated to a second network station upon which to transmit a second signal, the second wideband signal generated during second pseudorandom time periods together with the second wideband signal, the second wideband signal of a bandwidth greater than a corresponding second-signal bandwidth of the second signal and the second wideband signal of a signal level less than a corresponding second-signal signal strength, and the signal level of the second wideband signal less than the noise floor level; and a second transmitter coupled to said first wideband signal generator, said second transmitter for transmitting the second signal upon the second channel, the second signal used, subsequent to detection at the mobile station, to facilitate the determination of the geographic positioning of the mobile station.

3. The apparatus of claim 2 wherein the first network station is spaced-apart from the second network station, wherein the first wideband signal is broadcast by said first transmitter to which said first wideband signal generator is coupled, and wherein the second wideband signal is broadcast by said second transmitter to which said second wideband signal generator is coupled.

4. The apparatus of claim 2 wherein the first pseudorandom time periods and the second pseudorandom time periods comprise non-overlapping periods.

5. The apparatus of claim 2 wherein said at least the first wideband signal generator further comprises a third wideband signal generator for generating a third wideband signal for communication upon a third channel allocated to a third network station upon which to transmit a third signal, the third wideband signal generated during third pseudorandom time periods together with the third wideband signal, the third wideband signal of a bandwidth greater than a corresponding third-signal bandwidth of the third signal and the third wideband signal of a signal level less than a corresponding third-signal signal strength.

6. The apparatus of claim 1 wherein the first wideband signal generated by said first wideband signal generator includes a first sequence of values, the first sequence of values identifying the first wideband signal as being generated by said first network station.

7. In the radio communication system of claim 1, a further improvement of apparatus for determining the geographical positioning of the mobile station, said apparatus comprising:

a detector for detecting reception at the mobile station of the at least the first wideband signal generated by said at least first wideband signal generator and transmitted by said first transmitter;

a position determiner coupled to receive indications of detections made by said detector, said position determiner for determining the geographical positioning of the mobile station responsive to indicia associated with the at least the first wideband signal.

8. The apparatus of claim 7 wherein the indicia associated with the at least the first wideband signal comprises indicia identifying a time at which the at least the first wideband signal is received at the mobile station.

9. The apparatus of claim 7 wherein the indicia associated with the at least the first wideband signal comprises indicia at least permitting determination of a position of the at least the first network station at which the at least first wideband signal is broadcast.

10. The apparatus of claim 9 wherein said position determiner comprises a correlator coupled to receive values of the at least the first wideband signal detected by said detector, said correlator for performing correlation operations upon the values, results of the correlation operations performed thereat used to determine the geographical positioning of the mobile station.

11. The apparatus of claim 7 wherein said determiner is positioned at the mobile station.

12. The apparatus of claim 7 wherein said determiner is positioned external to the mobile station.

13. The apparatus of claim 12 wherein said determiner is positioned at the network part of the radio communication system.

14. The apparatus of claim 13 wherein said apparatus further comprises an indicia signal generator coupled to said detector, said indicia signal generator for generating an indicia signal for communication to said position determiner to provide said position determiner with the indications of the detections made by said detector.

15. In a method for communicating in a radio communication system operable to communicate communication signals upon a common bandwidth, the radio communication system having a network part installed to encompass a geographical area and a mobile station positionable therein, an improvement of a method for facilitating determination of geographical positioning of the mobile station, said method comprising:

generating at least a first wideband signal upon at least a first channel allocated to at least a first network station upon which to transport a first signal, the at least the first wideband signal of a bandwidth greater than a corresponding first-signal bandwidth of the first, signal and the first wideband signal of a signal level less than a corresponding first-signal signal strength and the first wideband signal including coded values identifying the at least the first network station from which the at least the first wideband signal is broadcast;

transmitting, during at least a first pseudorandom time period, the at least the first wideband signal upon the at least the first channel;

detecting at the mobile station, the at least the first wideband signal transmitted upon the at least the first channel; and determining, responsive to indications of detections made during said operation of detecting, the geographical positioning of the mobile station by performing correlation operations upon indications of the at least the first wideband signal detected during said operations of detecting.

16. The method of claim 15 wherein said operation of determining is performed at the mobile station.

17. The method of claim 15 wherein the communication system defines a noise floor level and wherein the signal level of the at least the first wideband signal is less than the noise floor level.

* * * * *